United States Patent
Kanne

(10) Patent No.: US 7,905,140 B2
(45) Date of Patent: Mar. 15, 2011

(54) DEVICE WITH FLOW SENSOR FOR HANDLING FLUIDS

(75) Inventor: Ulf Kanne, Zürich (CH)

(73) Assignee: Sensirion AG, Stafa (CH)

( * ) Notice: Subject to any disclaimer, the term of this patent is extended or adjusted under 35 U.S.C. 154(b) by 250 days.

(21) Appl. No.: 12/009,680

(22) Filed: Jan. 21, 2008

(65) Prior Publication Data

US 2008/0210001 A1    Sep. 4, 2008

(30) Foreign Application Priority Data

Mar. 1, 2007   (DE) ..................... 20 2007 003027 U

(51) Int. Cl.
*G01F 1/68* (2006.01)
(52) U.S. Cl. ................................... 73/204.26
(58) Field of Classification Search ............ 73/204.26, 73/204.15, 861.08, 204.22, 204.17, 204.21; 338/219
See application file for complete search history.

(56) References Cited

U.S. PATENT DOCUMENTS

| | | | |
|---|---|---|---|
| 4,255,968 A | 3/1981 | Harpster | |
| 4,501,145 A | 2/1985 | Boegli et al. | |
| 4,542,650 A * | 9/1985 | Renken et al. | 73/196 |
| 4,548,078 A | 10/1985 | Bohrer et al. | |
| 4,672,997 A | 6/1987 | Landis et al. | |
| 4,829,818 A | 5/1989 | Bohrer et al. | |
| 5,081,866 A | 1/1992 | Ochiai et al. | |
| 5,228,329 A | 7/1993 | Dennison | |
| 5,230,245 A | 7/1993 | Kamiunten et al. | |
| 5,233,868 A | 8/1993 | Coats et al. | |
| 5,396,795 A | 3/1995 | Araki | |
| 5,398,549 A | 3/1995 | Suzuki | |
| 5,404,753 A | 4/1995 | Hecht et al. | |
| 5,980,102 A | 11/1999 | Stulen et al. | |
| 6,035,711 A | 3/2000 | Huijsing et al. | |
| 6,209,402 B1 | 4/2001 | Yamada | |
| 6,349,596 B1 | 2/2002 | Nakada et al. | |
| 6,351,390 B1 | 2/2002 | Mayer et al. | |
| 6,526,823 B2 | 3/2003 | Tai et al. | |
| 6,550,324 B1 | 4/2003 | Mayer et al. | |
| 6,550,325 B1 | 4/2003 | Inushima et al. | |

(Continued)

FOREIGN PATENT DOCUMENTS

DE    10129300    6/2001

(Continued)

OTHER PUBLICATIONS

F. Mayer et al., Proc. IEEE International Electron Devices Meeting (IEDM, 1997), pp. 895-898.

(Continued)

*Primary Examiner* — Jewel Thompson
(74) *Attorney, Agent, or Firm* — Richard F. Jaworski; Cooper & Dunham LLP

(57) ABSTRACT

A channel substrate containing at least one channel for a fluid is provided. A sensor substrate carrying a thermal flow sensor is arranged adjacent to the channel substrate. The flow sensor contains at least one temperature sensor and at least one heater, which are integrated on the sensor substrate. The heater and the temperature sensor are in thermal contact with the channel in the channel substrate. This arrangement allows to measure the flow of the fluid in the channel, which provides an improved monitoring and control. The sensor substrate can have contact pads connected to bond wires or, using flip-chip technology, the contact pads can be connected to circuit paths to the channel substrate.

19 Claims, 4 Drawing Sheets

U.S. PATENT DOCUMENTS

| | | |
|---|---|---|
| 6,591,674 B2 | 7/2003 | Gehman et al. |
| 6,628,202 B2 | 9/2003 | McQueen et al. |
| 6,632,400 B1 | 10/2003 | Brennan et al. |
| 6,662,121 B1 | 12/2003 | Oda et al. |
| 6,672,154 B1 | 1/2004 | Yamagishi et al. |
| 6,681,742 B1 | 1/2004 | Hirayama et al. |
| 6,684,694 B2 | 2/2004 | Fujiwara et al. |
| 6,720,866 B1 | 4/2004 | Sorrells et al. |
| 6,763,710 B2 | 7/2004 | Mayer et al. |
| 6,779,395 B2 | 8/2004 | Hornung et al. |
| 6,813,944 B2 | 11/2004 | Mayer et al. |
| 6,888,358 B2 | 5/2005 | Lechner et al. |
| 2002/0043104 A1 | 4/2002 | Lammerink |
| 2002/0043710 A1 | 4/2002 | Mayer et al. |
| 2003/0049877 A1 | 3/2003 | Mayer et al. |
| 2003/0115952 A1 | 6/2003 | Mayer et al. |
| 2003/0132866 A1 | 7/2003 | Haeberli et al. |
| 2004/0000196 A1 | 1/2004 | Kleinlogel et al. |
| 2004/0118218 A1 | 6/2004 | Mayer et al. |
| 2004/0163464 A1 | 8/2004 | Nakada et al. |
| 2006/0144138 A1 | 7/2006 | Yamada et al. |
| 2006/0147898 A1* | 7/2006 | Awazu ............................ 435/4 |
| 2007/0075840 A1 | 4/2007 | Brandt et al. |
| 2007/0227242 A1 | 10/2007 | Mayer et al. |
| 2007/0241093 A1 | 10/2007 | von Waldkirch et al. |

FOREIGN PATENT DOCUMENTS

| | | |
|---|---|---|
| DE | 10129300 | 2/2002 |
| DE | 2007003027 | 7/2007 |
| EP | 0172669 | 7/1985 |
| EP | 1065475 | 1/2001 |
| EP | 1873499 | 1/2008 |
| GB | 1035324 | 7/1966 |
| WO | 0118500 | 3/2001 |

OTHER PUBLICATIONS

"Liquid Drug Delivery Monitoring & Control", Drug Delivery Technology, Mr. Ulf Kanne, Jan. 2006, vol. 6, No. 1.

IEEE Micro Electron Mechanical System IEEE, 1996, 116-121, "The Ninth Annual International Workshop on Micro Electron Mechanical Systems" San Diego, California, USA Feb. 11-15, 1996, Scaling of Thermal CMOS Gas Flow Microsensors: Experiment and Simulation, F. Mayer et al.

IEEE Proceedings MEMS98, pp. 351-355, Catalog No. 98CH36176, "The Eleventh Annual International Workshop on Micro Electron Mechanical Systems", Jan. 25-29, 1998, Heidleberg, Germany, Thermal Flow Sensor for Liquids and Gases, M. Ashauer et al.

J. Micromech. Microeng. 14 (2004) pp. 1576-1584—"Building Embedded Microchannels Using a Single Layered SU-8, and determining Young's Modulus Using a Laser Acoustic Technique", Hui Yu et al.

* cited by examiner

DEVICE WITH FLOW SENSOR FOR HANDLING FLUIDS

CROSS REFERENCE TO RELATED APPLICATIONS

This application claims the priority of German utility model application 20 2007 003 027.4, filed Mar. 1, 2007, the disclosure of which is incorporated herein by reference in its entirety.

BACKGROUND OF THE INVENTION

The invention relates to a device for handling fluids comprising at least one channel in a substrate. Devices of this type are e.g. of the "lab on chip" type and can be used, inter alia, for analyzing very small quantities of liquids or to subject fluids to biological or chemical reactions. Devices of this type may also be simple devices with a single duct, such as e.g. used for a flow sensor.

It is of importance that the processes carried out on the device can be monitored and/or controlled accurately.

BRIEF SUMMARY OF THE INVENTION

Hence, it is a general object of the invention to provide a device of the type mentioned above that allows an accurate monitoring and/or control of the processes.

Now, in order to implement these and still further objects of the invention, which will become more readily apparent as the description proceeds, the device for handling fluids comprises a channel substrate, a channel arranged in said channel substrate for receiving the fluid, a sensor substrate arranged adjacent to said channel substrate, and a thermal flow sensor arranged on said sensor substrate, said flow sensor comprising a heater and at least one temperature sensor integrated on the sensor substrate, wherein the heater and the temperature sensor are in thermal contact with said channel.

Accordingly, a channel substrate containing at least one channel for the fluid is provided. A sensor substrate carrying a thermal flow-sensor is arranged at, in particular adjacent to, the channel substrate. The flow sensor comprises at least one temperature sensor and at least one heater, which are integrated on the sensor substrate. The heater and the temperature sensor are in thermal contact with the channel in the channel substrate. This arrangement allows to measure the flow of the fluid in the channel, thereby providing improved monitoring and control as mentioned above. Since the flow sensor is integrated on its own sensor substrate, the channel substrate and the flow sensor can be manufactured separately, which allows to use optimized manufacturing techniques for both parts.

The term "fluid" is to be understood in a broad manner and relates to any substances that can flow, in particular liquids and gases.

In a second aspect of the invention, the device comprises a channel substrate, at least one channel arranged in said channel substrate for receiving the fluid, a sensor substrate arranged at said channel substrate, a thermal flow sensor arranged on said sensor substrate, said flow sensor comprising a heater and at least one temperature sensor integrated on the sensor substrate, a shield blocking visible and near infrared light and preventing said light from reaching said temperature sensor, wherein the heater and the temperature sensor are in thermal contact with said channel.

The shield according to this aspect of the invention provides improved measurement accuracy because it prevents the incoming photons from affecting the signal generated by the temperature sensor.

In yet a further aspect of the invention, it is an object to provide a device that can be assembled easily. In this aspect of the invention, the device comprises a channel substrate, at least one channel arranged in said channel substrate for receiving the fluid, a sensor substrate arranged at said channel substrate, a thermal flow sensor arranged on said sensor substrate, said flow sensor comprising a heater and at least one temperature sensor integrated on the sensor substrate, circuit paths mounted to said channel substrate, wherein the heater and the temperature sensor are in thermal contact with said channel, and wherein said sensor substrate is electrically connected to said circuit paths.

In this aspect, the channel substrate acts as a carrier for the circuit paths, thereby reducing the number of parts that need to be assembled.

In yet a further aspect of the invention, it is again an object to provide a device which is assembled easily. In this aspect, the device comprises a channel substrate having a cover layer, an upper plate and a lower plate, at least one channel arranged in said first and second plate of said channel substrate for receiving the fluid, wherein said channel is covered by said cover layer a sensor substrate arranged at an outer side of said cover layer at said channel, a thermal flow sensor arranged on said sensor substrate, said flow sensor comprising a heater and at least one temperature sensor integrated on the sensor substrate, wherein the heater and the temperature sensor are in thermal contact with said channel.

By using a channel substrate having a cover layer, an upper plate and a lower plate, the channel can be shaped easily in the upper and the lower plate, while the cover plate allows to insulate the sensor substrate from the fluid.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
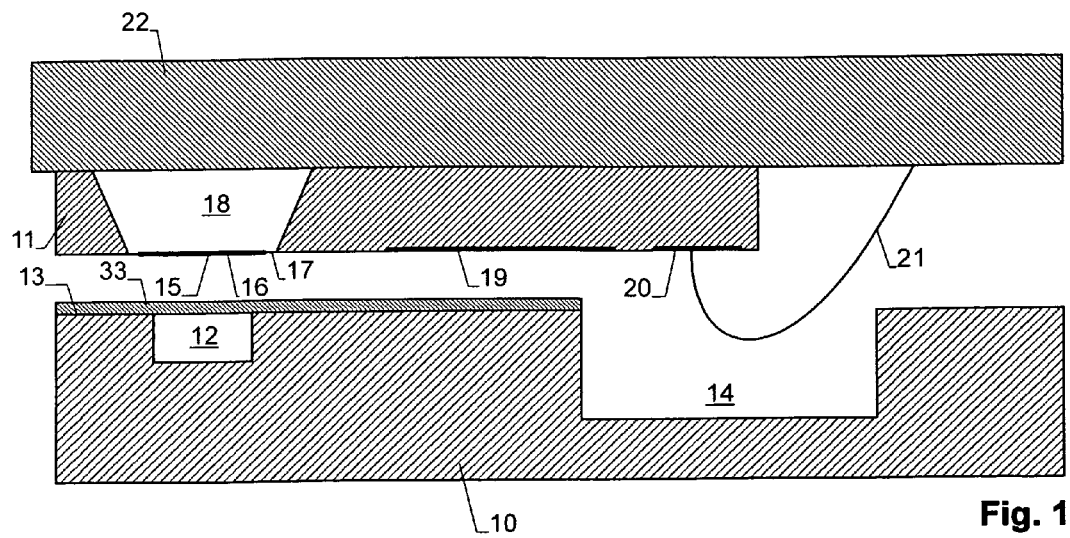
FIG. 1 is a sectional view of a channel substrate and a sensor substrate prior to assembly.
Figure 2:
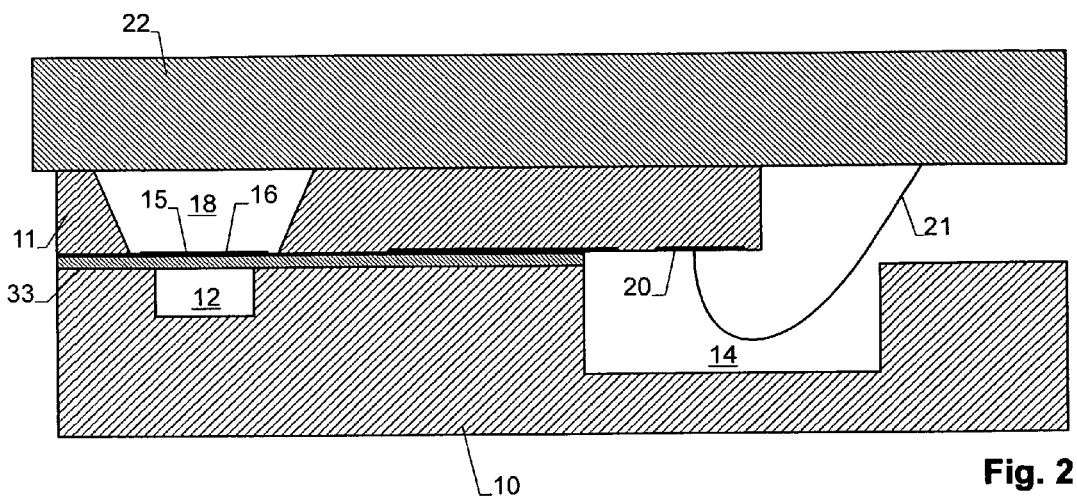
FIG. 2 is the arrangement of FIG. 1 after assembly.

A first embodiment of the device is shown in FIGS. 1 and 2. It comprises two primary parts, namely a channel substrate 10 and a sensor substrate 11.

The channel substrate 10 is a substantially plate-shaped body carrying at least one channel 12 for receiving a fluid. Channel substrates of this type are known. They are micromechanical devices, whose channels have typical cross-sectional areas of some 10 or some 100 $\mu m^2$. Such devices are e.g. offered by Caliper Life Sciences in Hopkinton (USA), as well as by Micronit Microfluidics BV in Enschede (NL) and thinXXS Microtechnology AG in Zweibrücken (DE). The channel substrate 10 can e.g. be made of glass or plastics. The channel 12 is, in the present embodiment, formed by a recess in a surface 13 of the channel substrate. The recess can e.g. by manufactured by etching techniques or injection casting in a suitable mould.

The recess of the embodiment of FIG. 1 is covered by a cover layer 33 for forming the channel 12. Cover layer 33 is attached to channel substrate 10. It can e.g. be of plastics or glass.

Further, a second recess 14 is provided in the channel substrate 10 of FIG. 14. The purpose of this second recess is described further below.

The sensor substrate 11, which is advantageously a semiconductor substrate with electronic components integrated thereon, but which can e.g. also be made of glass, forms part of a thermal flow sensor for the fluid running through channel 12. This flow sensor comprises at least one heater 15 and at least one temperature sensor 16, which are arranged at least partially on a thin membrane 17, which extends over an opening or recess 18 in sensor substrate 11. Flow sensors of this type are known to the person skilled in the art, see e.g. WO 00/37895 and EP 1 351 039. They are based on the idea that the heater 15 is brought into thermal contact with a flowing fluid. Depending on the flow rate of the fluid, the temperature in the vicinity of heater 15 will change, which can be detected by temperature sensor 16. In principle, temperature sensor 16 can be formed by heater 15 itself. Advantageously, though, one or two temperature sensor(s) 16 is/are provided separately from heater 15, as described in the prior art cited above.

In addition to this, an analogue and/or digital control circuit 19 can be integrated on sensor substrate 11, which allows to control heater 15 and to process the detected signals. Further, contact pads 20 are mounted to sensor substrate 11 and connected in conventional manner to bond wires 21 for electrically connecting the sensor substrate 11 with a master system. The contact pads 20 can be made of metal. They can also be designed as so-called "flip chip" contacts.

The bond wires 21 lead to a circuit path carrier 22. This can e.g. be a printed circuit or a so-called "flexprint", which carries, in known manner, circuit paths and, optionally, other components, such as a connector. Sensor substrate 11 is attached to circuit path carrier 22, in such a manner that the side of sensor substrate 11 carrying heater 15 and temperature sensor 16 as well as control circuit 19 is facing away from circuit path carrier 22.

Sensor substrate 11 and circuit path carrier 22 together form a sensing unit, which is attached to channel substrate 10 in the manner shown in FIG. 2. The attachment can e.g. be formed by glue. To attach the sensing unit, sensor substrate 11 is positioned such that heater 15 and temperature sensor 16 come to lie above channel 12. They are in thermal contact with cover layer 33, in such a manner that the temperature at the position of temperature sensor 16 depends on the flow rate of the fluid in channel 12.

As can be seen from FIG. 2, the second recess 14 in channel substrate 10 is positioned such that the contact pads 20 come to rest above it. Hence, the bond wires 21 can extend through recess 14 and it is possible to contact the contact pads 20 even though they are arranged on the side of sensor substrate 11 that faces channel substrate 10. Recess 14 can also extend all through channel substrate 10.

Alternatively, circuit paths can be provided on channel substrate 10, and the contact pads 20 can be connected to the same, e.g. by means of flip-chip technology. Such an embodiment is described with reference to FIG. 8 below. For providing a thermal contact between heater 15 and channel 12, and between temperature sensor(s) 16 and channel 12, thermal bridges between the components can be provided, as disclosed in EP 1 351 039.

In yet another alternative, a flexible or rigid circuit path carrier can be arranged between channel substrate 10 and sensor substrate 11, at least in the region of the contact pads 20, and the contact pads 20 can be connected to this circuit path carrier by means of flip-chip technology.

Figure 3:
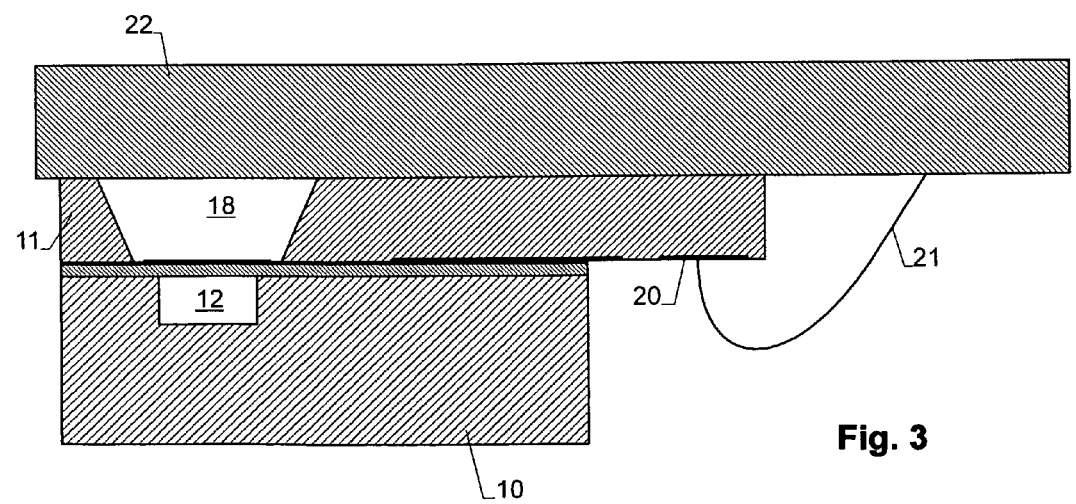
FIG. 3 is a second embodiment of the device.

FIG. 3 shows an alternative embodiment without the second recess 14 in channel substrate 10. In this embodiment, the sensor substrate 11 projects laterally over the side of channel substrate 10, in such a manner that the contact pads 20 are located in the laterally projecting section of sensor substrate 11, such that the bond wires 21 are not obstructed.

Figure 4:
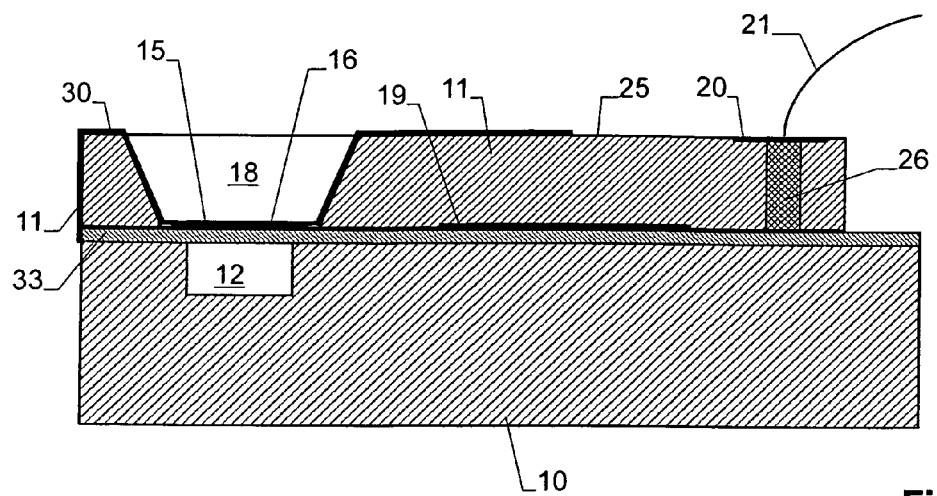
FIG. 4 is a third embodiment of the device.

Yet a further possibility for connecting the bond wires 21 is shown in FIG. 4. In this embodiment, the contact pads 20 are arranged at the side 25 of sensor substrate 11 that faces away from channel substrate 10. For connecting the contact pads 20 with control circuit 19 and/or heater 15 and temperature sensor 16, which are located on the opposite side of sensor substrate 11, suitable through-contacts 26 are provided. The term "through-contacts" is to be understood in broad manner and designates any structures that are suited to connect the contact pads 20 to the components arranged on the opposite side of sensor substrate 11. In the embodiment of FIG. 4 the through-contacts 26 extend through sensor substrate 11 and are e.g. formed by highly doped regions of the substrate material.

The device of FIG. 4 is also suited for connecting the contact pads 20 by means of "flip-chip technology" to circuit path carrier 22. Through-contacts can be used as well.

In particular if the temperature sensor 16 is a thermocouple or thermopile, it is important to protect the same from visible and near-infrared light, e.g. in the spectral region of 2 $\mu m$ down to at least 450 nm, in order to obtain high measurement accuracy. Therefore, a shield 30 blocking visible and near-infrared light is advantageously provided, for preventing that such light reaches the temperature sensor(s) 16. In the embodiment of FIG. 4, shield 30 is arranged on the side 25 of sensor substrate 11, which faces away from channel substrate 10. In particular if channel substrate 10 is transparent, a light absorbing layer should also be arranged at the opposite side of sensor substrate 11 for covering temperature sensor 16, or channel substrate 10 should be covered by such a layer. Instead of or in addition to a light absorbing layer, a light absorbing housing can be used as shield.

Figure 5:
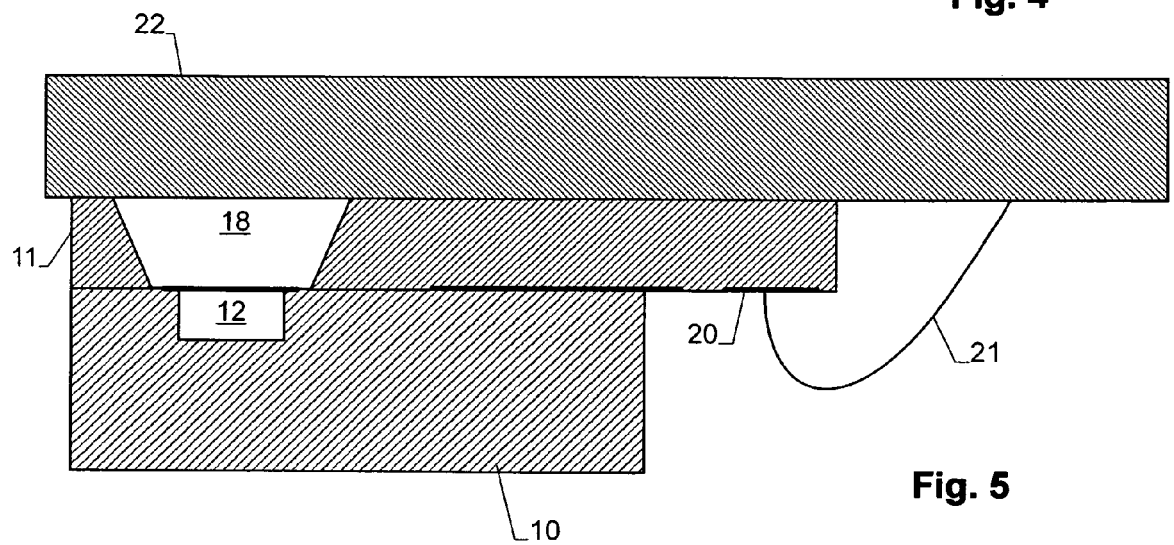
FIG. 5 is a fourth embodiment of the device.

In the embodiments shown so far, a cover layer 33 was arranged on channel substrate 10 in order to close channel 12 from above. An alternative thereto is shown in the embodiment of FIG. 5. This embodiment corresponds substantially to the one of FIG. 3, but the cover layer 33 was omitted and the sensor substrate 11 forms the lid for channel 12. This allows to form a direct thermal contact between heating 15, temperature sensor 16 and the fluid, such that the measurement accuracy or sensitivity can be increased.

Figure 6:
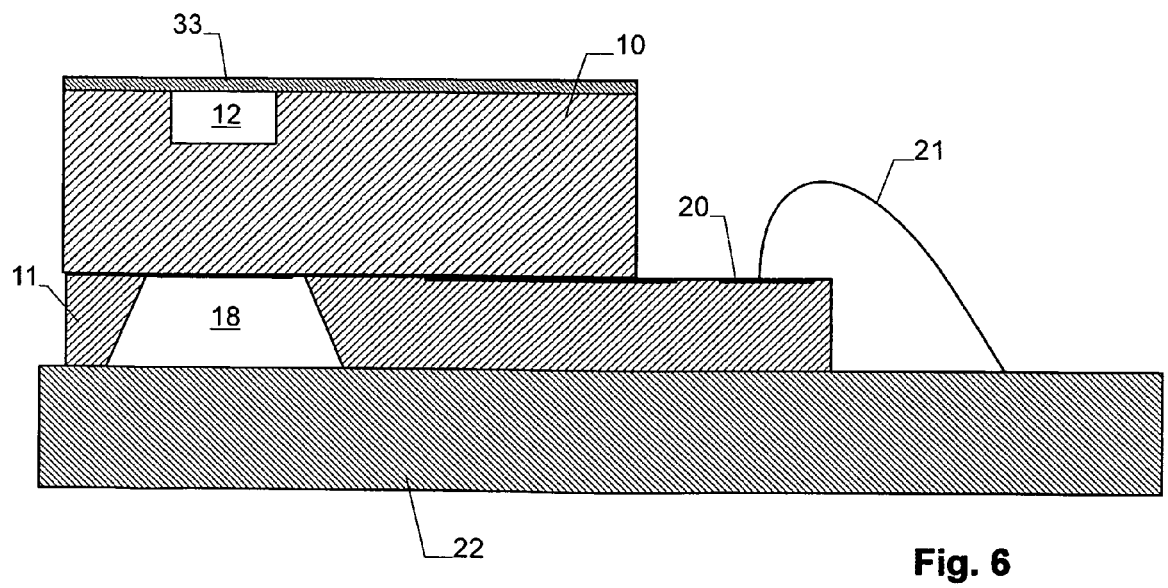
FIG. 6 is a fifth embodiment of the device.

In a further embodiment, shown in FIG. 6, sensor substrate 11 is arranged on the side of channel substrate 10 that is opposite to the recess for channel 12. In this case, thermal coupling between heater 15, temperature sensor 16 and the fluid occurs through channel substrate 10.

In the embodiments shown so far, channel 12 was formed by a recess in channel substrate 10. It is, however, also possible that channel 12 is not formed by a recess, but by a cavity in channel substrate 10. Such a cavity can e.g. be manufactured by drilling, injection casting, or a combination or laser irradiation and etching techniques, see e.g. Hui Yu, Oluwaseyi Balogun, Biao Li, Todd Murray and Xin Zhang in J. Micromech. Microeng. 14(2004) 1576-1584.

The described devices can be used in various manner. Examples for applications are
  measuring the flow in one or more channels,
  monitoring or controlling of mixing processes in a network of several channels and having several measurement locations,
  measuring the expansion of the fluid due to a flow in channel 12 generated by the expansion,
  detecting the presence of the fluid in channel 12,
  measuring the properties of the fluid in channel 12,
  detecting the formation of air bubbles in the fluid,
  detecting a clogging or a leak in channel 12,
  monitoring reaction or mixing products,
  monitoring or controlling actuators, pumps or valves of the system guiding the fluid.

Depending on how it is used, the device can be disposed of after a single use, or it can be used several times. It is also possible to dispose of channel substrate 10 only, while sensor substrate 11 and circuit path carrier 22 are used several times.

In the embodiments shown so far, only a single channel 12 was shown in channel substrate 10. In many applications, the number of channels will be larger than one. The length and course of the channels can be adapted to the respective needs.

Also depending on the intended application, several sensor substrates or a single sensor substrate with several integrated sensors can be used with a single channel substrate 10, such that a flow measurement can be carried out at several locations of a single channel or on several channels.

In the embodiments shown so far, various possibilities have been shown for connecting sensor substrate 11 via bond wires 21 to a master system. Yet a further possibility is now described with reference to FIG. 7. The flow sensor shown schematically in this figure comprises a heater 15 and two temperature sensors 16*a*, 16*b*, which are controlled and whose signals are processed by a control circuit 19. The control circuit, which is integrated on sensor substrate 11 together with the heater 15 and the temperature sensors 16*a*, 16*b*, is connected to an antenna, which is also integrated on sensor substrate 11, or which is separate from sensor substrate 11, e.g. on a separate printed circuit board. Further, an energy storage 29, e.g. a capacitor, is provided, which can also either be integrated on sensor substrate 11 or be implemented as a separate component, e.g. attached to sensor substrate 11.

Figure 7:
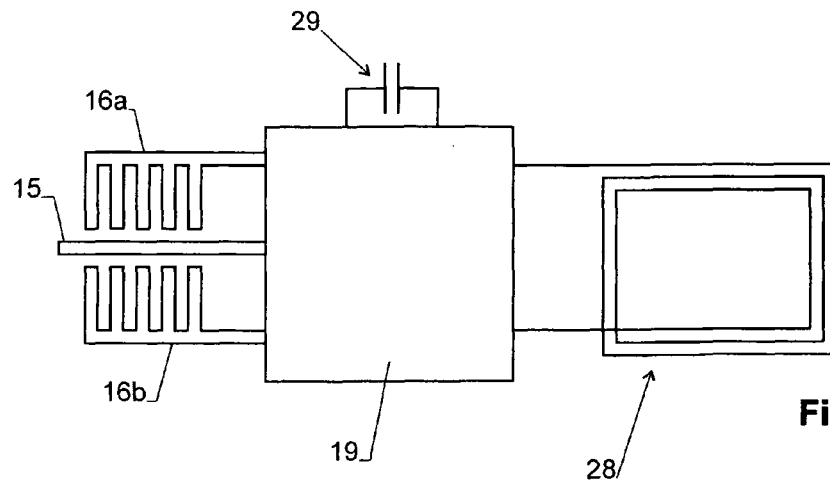
FIG. 7 is a schematic block circuit diagram of a sensor with wireless interface.

In the schematically shown embodiment of FIG. 7, the antenna 28 is a coil, in whose windings a current can be induced by means of an alternating magnetic field. In this manner it becomes possible to feed electrical energy to sensing substrate 11 and/or to transmit data to the same. In addition to this, control circuit 19 can be designed to feed an alternating current into antenna 28, e.g. during a certain phase of an operating cycle, in order to transmit data to the master system.

Instead of a coil, a microwave antenna can also be used for feeding power and transmitting data, as it is known from so-called RF-ID-Systems or in Near Field Communication (NFC).

Figure 8:
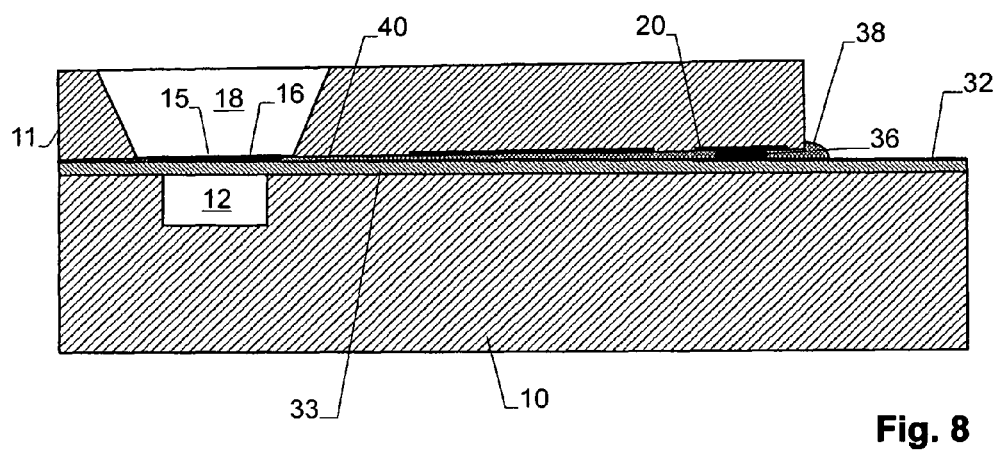
FIG. 8 is a sixth embodiment of the device.

As mentioned, in yet a further embodiment circuit paths can be affixed to channel substrate 10 and be connected to measurement substrate 11. Such an embodiment is shown in FIG. 8. Here, circuit paths 32 are arranged on the side of channel substrate 10 that faces sensor substrate 11. The position of the circuit paths 32 is such that they form matching contact fields for the contact pads 20. The contact pads 20 are facing channel substrate 10 and have metal bumps 36 attached thereto.

To mount sensor substrate 11 on channel substrate 10, it is placed such that the metal bumps 36 contact the circuit paths 32. A flip-chip glue 38 is located between sensor substrate 11 and channel substrate 10 and is caused to harden. A flip-chip glue is, as known to the person skilled in the art, a glue that shrinks in volume when hardening, thereby facilitating a good electric contact between the metal bumps 36 and the circuit paths 32. Alternatively to gluing, soldering techniques can be used.

As can be seen from FIG. 8, the metal bumps are arranged on one end section of sensor substrate 11 only, namely at the end section remote from heater 15 and temperature sensor 16. Thus the opposite end of sensor substrate 11 lies directly against channel substrate 10, i.e. sensor substrate 11 and channel substrate 10 are arranged in non-parallel fashion at an angle with a wedge-shaped gap 40 therebetween. This allows to bring heater 15 and temperature sensor 16 closer to channel 12. Gap 40 is filled by glue 38, or another thermally conducting filler material, which further improves the thermal contact between channel 12 and heater 15 as well as between channel 12 and temperature sensor 16.

Figure 10:
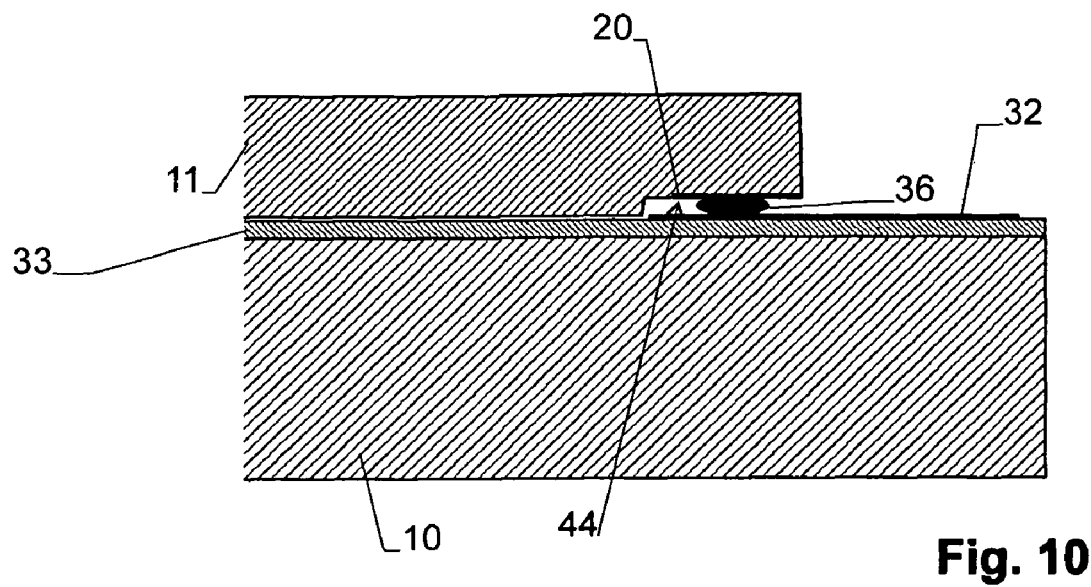
FIG. 10 is an eighth embodiment of the device.

Alternatively to a non-parallel mounting of sensor substrate 11 on channel substrate 10, the metal bumps 36 can be arranged in a set back section 44 of sensor substrate 11, as shown in FIG. 10, thereby allowing a parallel, flush arrangement of sensor substrate 11 and channel substrate 10. Section 44 is set back in the sense that the surface of sensor substrate 11 that faces channel substrate 10 is more distant from channel substrate 10 in the set back section 44 than at the location of heater 15 and temperature sensor 16.

Figure 11:
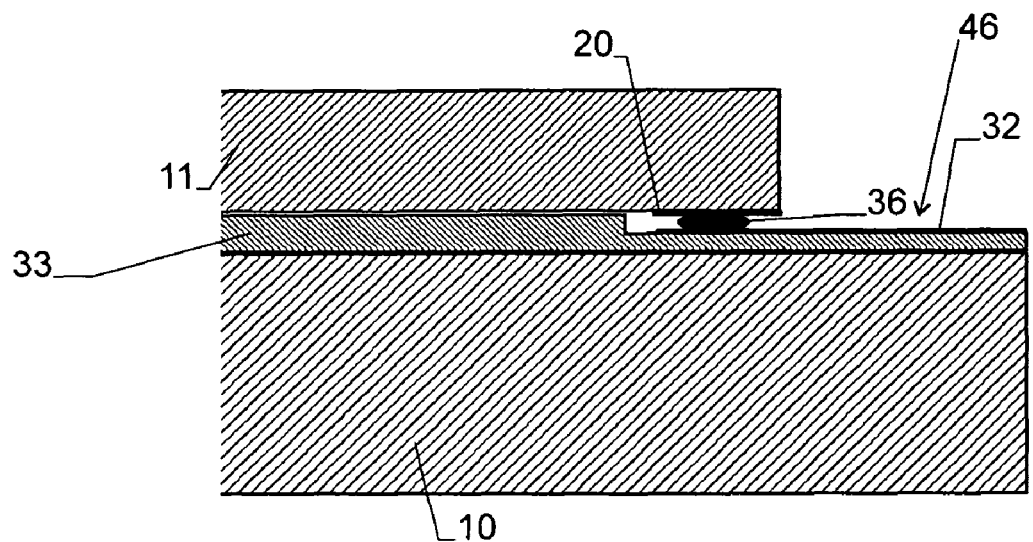
FIG. 11 is a ninth embodiment of the device.

In yet another embodiment, as shown in FIG. 11, the circuit paths 32 on channel substrate 10 can be arranged in a set back section 46 of channel substrate 10, thereby again allowing a parallel, flush arrangement of sensor substrate 11 and channel substrate 10. Section 46 is set back in the sense that the surface of cannel substrate 10 that faces sensor substrate 11 is more distant from sensor substrate 11 in the set back section 46 than at the location of heater 15 and temperature sensor 16.

The circuit paths 32 can be mounted directly to the top of channel substrate 10, namely to cover layer 33. They can be applied thereto i.e. by printing techniques, such as screen printing, using a conductive ink. Other methods can be used as well for manufacturing the circuit paths 32, e.g. electroplating or sputtering.

Figure 9:
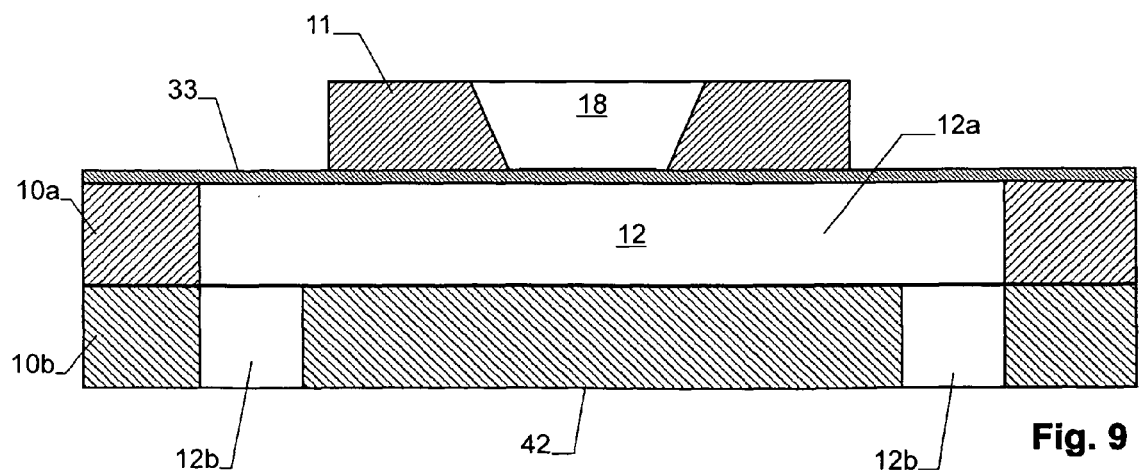
FIG. 9 is a seventh embodiment of the device.

FIG. 9 shows a very simple embodiment of the device. In contrast to the previous figures, this figure is a sectional view where the flow of the fluid is parallel to the drawing plane.

As can be seen, channel substrate 10 is assembled from two plates 10*a*, 10*b* stacked on top of each other and topped by cover layer 33. The two plates 10*a*, 10*b* as well as cover plate 33 are connected to each other in fluid-tight manner, e.g. by gluing or bonding. Sensor substrate 11 is, as in the embodiment of FIGS. 1-4 and 8, arranged on the outer side of cover layer 33.

Channel 12 has, in the example of FIG. 9, the shape of an inverse U, with a base channel section 12*a* formed by an opening in upper plate 10*a*. Both opposite ends of base channel section 12*a* are in communication with two traverse channel sections 12*b*, formed by openings in lower plate 10*b*.

The traverse channel sections 12*b* form an input and an output for channel 12 at the bottom side 42 of channel plate 10, i.e. at the side facing away from sensor substrate 11. In use, the device can be mounted with bottom surface 42 resting against a fluid conducting system that has two orifices in alignment with the traverse channel sections 12*b*.

Using two separate plates 10*a*, 10*b* for forming channel plate 10 allows to easily manufacture complex channel geometries, such as the one of FIG. 9.

While there are shown and described presently preferred embodiments of the invention, it is to be distinctly understood that the invention is not limited thereto but may be otherwise variously embodied and practised within the scope of the following claims.

The invention claimed is:

1. A device for handling fluids comprising
 a channel substrate,
 at least one channel arranged in said channel substrate for receiving the fluid, wherein said channel is formed by at least one recess in said channel substrate,
 a sensor substrate arranged at said channel substrate, and
 a thermal flow sensor arranged on said sensor substrate, said flow sensor comprising a heater and at least one temperature sensor integrated on the sensor substrate,
 wherein said channel substrate comprises a cover layer covering and closing said recess, and wherein the heater and the temperature sensor are in thermal contact with said cover layer and thereby with said channel, and
 wherein said sensor substrate is arranged on an outer side of said cover layer.

2. A device for handling fluids comprising
 a channel substrate,
 at least one channel arranged in said channel substrate for receiving the fluid,
 a sensor substrate arranged at said channel substrate, and
 a thermal flow sensor arranged on said sensor substrate, said flow sensor comprising a heater and at least one temperature sensor integrated on the sensor substrate,
 wherein the heater and the temperature sensor are in thermal contact with said channel,
 wherein the sensor substrate comprises contact pads arranged on a side of the sensor substrate that faces said channel substrate and
 wherein the contact pads are arranged at a part of the sensor substrate that laterally projects over said channel substrate.

3. The device of claim 2 further comprising bond wires connected to said contact pads for electrically connecting the sensor substrate to a master system.

4. The device of claim 3 wherein the contact pads are arranged over a recess in the channel substrate and the bond wires extend through the recess.

5. The device of claim 1 wherein the sensor substrate comprises contact pads arranged on a side of the sensor substrate that faces away from said channel substrate, and wherein electrical through-contacts extend from said contact pads to a face of said sensor substrate that faces said channel substrate.

6. The device of claim 1 wherein the sensor substrate forms a lid for the recess.

7. The device of claim 1 wherein the sensor substrate is arranged on a side of the channel substrate opposite to the recess.

8. The device of claim 1 further comprising a circuit path carrier carrying at least one circuit path, wherein said sensor substrate is arranged between said circuit path carrier and said channel substrate and is electrically connected to the circuit path carrier.

9. The device of claim 1 further comprising an antenna adapted to feed electricity to said sensor substrate and/or to communicate with said sensor substrate.

10. The device of claim 1 wherein said channel substrate is of plastics.

11. The device of claim 1 further comprising circuit paths on said channel substrate, wherein contact pads of said sensor substrate are connected to said circuit paths.

12. The device of claim 1 wherein said channel substrate comprises a first and a second plate arranged on top of each other, wherein said channel is formed by openings in said first and said second plates.

13. A device for handling fluids comprising
 a channel substrate,
 at least one channel arranged in said channel substrate for receiving the fluid,
 a sensor substrate arranged at said channel substrate,
 a thermal flow sensor arranged on said sensor substrate, said flow sensor comprising a heater and at least one temperature sensor integrated on the sensor substrate,
 circuit paths mounted to and arranged on said channel substrate,
 wherein the heater and the temperature sensor are in thermal contact with said channel, and wherein said sensor substrate is electrically connected to said circuit paths.

14. A device for handling fluids comprising
 at least one channel arranged in said channel substrate for receiving the fluid,
 a sensor substrate arranged at said channel substrate,
 a thermal flow sensor arranged on said sensor substrate, said flow sensor comprising a heater and at least one temperature sensor integrated on the sensor substrate,
 circuit paths mounted to and arranged on said channel substrate,
 wherein the heater and the temperature sensor are in thermal contact with said channel, and wherein said sensor substrate is electrically connected to said circuit paths
 wherein metal bumps are provided for electrically connecting said sensor substrate to said circuit paths, and wherein said sensor substrate and said channel substrate are arranged in non-parallel fashion with a wedge-shaped gap therebetween.

15. The device of claim 14 wherein said wedge-shaped gap is filled with a filler material.

16. The device of claim 14 wherein said metal bumps are arranged at one end section of sensor substrate only.

17. The device of claim 13 wherein metal bumps are provided for electrically connecting said sensor substrate to said circuit paths, wherein said metal bumps are arranged at a set back section of said channel substrate and/or in a set back section of said sensor substrate.

18. A device for handling fluids comprising
 a channel substrate having a cover layer, an upper plate and a lower plate,
 at least one channel arranged in said first and second plate of said channel substrate for receiving the fluid, wherein said channel is covered by said cover layer, a sensor substrate arranged at an outer side of said cover layer at said channel, and a thermal flow sensor arranged on said sensor substrate, said flow sensor comprising a heater and at least one temperature sensor integrated on the sensor substrate, wherein the heater and the temperature sensor are in thermal contact with said channel.

19. The device of claim 18 wherein said channel is formed by at least a base channel section formed by an opening in said upper plate and traverse channel sections formed by openings in said lower plate, wherein said traverse channel sections form an input and an output of said channel in a surface of said channel substrate facing away from said sensor substrate.

* * * * *